Patented Oct. 30, 1951

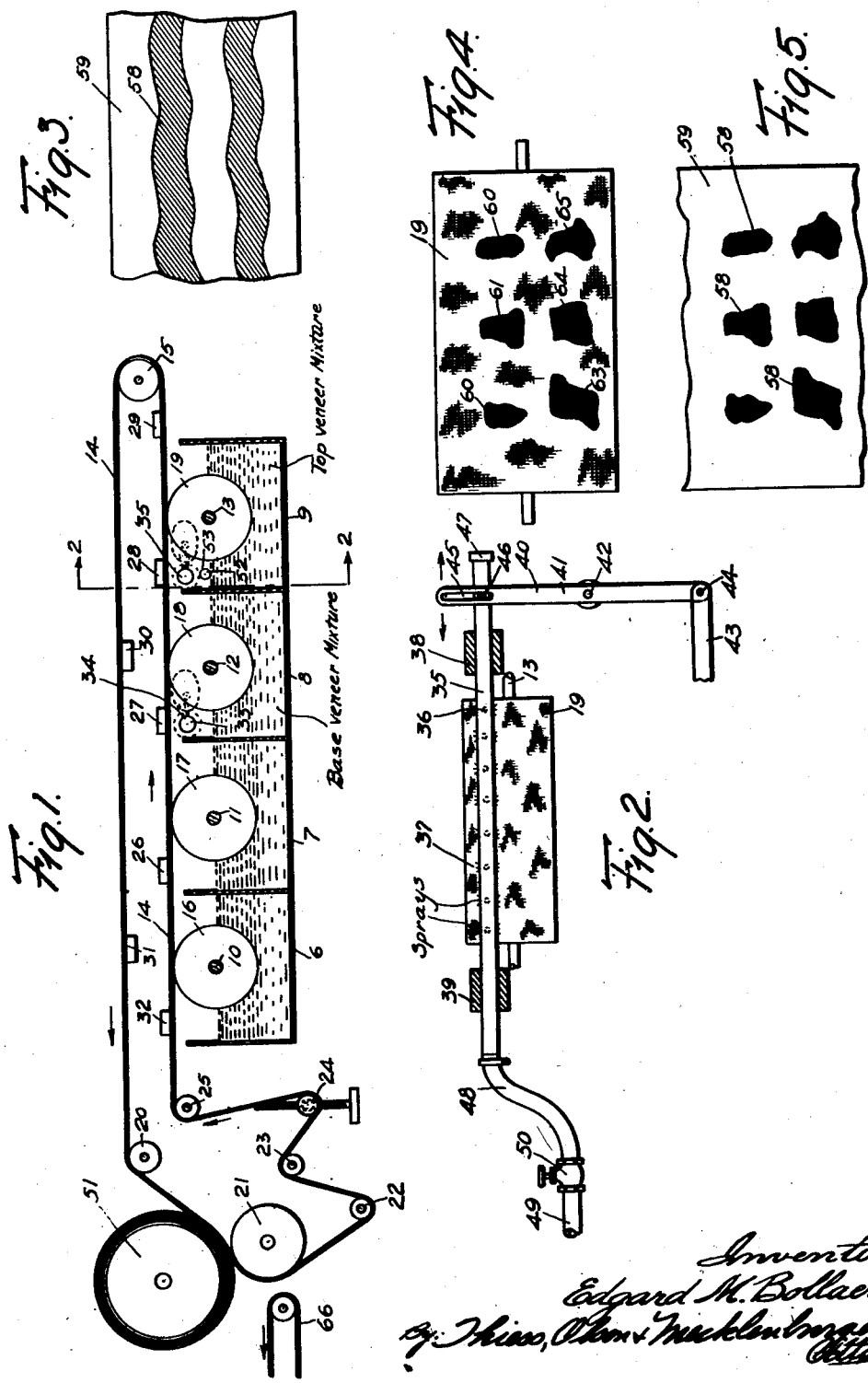

2,573,659

UNITED STATES PATENT OFFICE 2,573,659

METHOD OF MAKING COLOR ORNAMENTED ASBESTOS-CEMENT SHEETS

Edgard M. Bollaert, Chicago, Ill., assignor to United States Gypsum Company, Chicago, Ill., a corporation of Illinois Application July 27, 1946, Serial No. 686,669

1 Claim. (Cl. 92—39)

The present invention relates to asbestos-cement building materials and methods of making the same.

The invention is primarily concerned with the production of asbestos-cement building materials in the form of sheets such as are used either as siding or as shingles, and particularly when the said material is provided with an ornamented surface.

The manufacture of asbestos-cement building materials, such for example as shingles, has grown into a large industry and the processes for manufacturing these shingles or other similar materials has generally fallen into two general types of manufacturing procedure. One of these types is the so-called Norton process which is a dry process in which a mixture of suitable quantities of Portland cement or its equivalent and a fibrous material such as asbestos fiber is placed upon a traveling belt, is then moistened with sufficient water to make a pressable material which is then compacted and pressed into shape either by rolls or hydraulic presses, eventually being allowed to harden and set.

In the second process use is made of machinery which is very similar to that employed in the manufacture of multiple layers or laminations of cardboard. This method, which is generally known by the name of the original inventor thereof, Hatschek, makes use of vats or tanks containing a suspension of asbestos fiber and Portland cement in water, the suspension being of more or less flowable consistency. Rotating in these vats are foraminous cylinders, usually covered with a fine mesh metallic screen, which serve to pick up a thin film of the asbestos-cement composition which is then transferred to a continuously moving transfer belt made up of an absorbent material such for example as a woven or felted fabric.

Suction boxes on the opposite sides of the fabric serve to draw water out of the thus applied layer.

It is usually customary to employ a plurality of such layers and then to accumulate these on a large drum from which, when the layers have accumulated to a sufficient thickness, such for example as 5 to 8 layers, the material is stripped and then flattened out and either allowed to harden or preferably is compressed to a dense state by means of a roll or a hydraulic press. In so doing, the press, or at least one platen thereof, may be provided with a suitable mold so as to impress into the material a suitable design such for example as an imitation of wood grain.

The sheets are thereafter allowed to set and cure. The cure is often aided by submitting the sheets to the action of a highly heated steam atmosphere in which the cure can be accomplished in from 2 to 6 hours. The sheets are then cut up into suitable sizes, into shingles, strips, rectangles, sheets, or whatever shape it may be desired to produce. Such asbestos-cement sheets are usually characterized by a rather drab and uninteresting appearing color which is that of Portland cement. Moreover, their surfaces are usually fairly rough due to their embossed texture to obtain a desirable shingle surface, and in cities where there is much smoke, dirt and dust, buildings provided with such sheets often become quite unsightly.

While attempts have been made to correct these evils by providing such finished sheets with various types of coating or painting compositions, such application of separate coatings involves of course additional labor and material, particularly as most of these coatings have to be baked in order to be sufficiently adherent and weather resistant. A demand has therefore sprung up for more or less ornamental asbestos-cement siding and shingles which present a more pleasing appearance, with a smooth surface to which dirt will not adhere. They also present a variegated appearance occasioned by a difference in the color of the various areas of the product.

A number of proposals have been made to accomplish this, as for example by applying to the freshly formed sheets a suitable coloring composition which is sprayed thereonto and which then dries and hardens with the drying and hardening of the sheets themselves.

Other methods involve the application to the finished sheets of sprays of penetrating coloring matter or the formation thereon of designs, by means of granules of a suitable composition, which are compatible with the Portland cement and asbestos of the shingles or sheets. When exposed to the weather the granules soon become loose and fall off, leaving an undesirable surface.

All of these operations, however, require the installation of rather cumbersome special equipment which it is the object of the present invention to avoid while yet producing a pleasing, at least two-toned, asbestos-cement building material in the form of either sheets or shingles, having the appearance of a wood grain texture, or other ornamental designs and at the same time having a smooth surface.

Accordingly it is one of the objects of the present invention to produce at least two-tone asbestos-cement sheets which have a body of a number of laminations of asbestos-cement, a base veneer of an asbestos-cement composition, which has added pigments to give it any desired color from white to black, and a surface or top veneer of a contrasting color with that of the base veneer, but which top veneer is applied in such a manner as to leave certain predetermined or substantially predetermined areas of the base veneer visible.

A second object of the invention is to provide a method for producing sheets of the character just mentioned.

A still further object is to provide apparatus for the carrying out of the process for the production of the materials just mentioned.

Other objects of the present invention will become apparent from the further description herein below, and from the concurrently filed drawing in which:

Fig. 1 is an elevational view partially in section and more or less diagrammatic, of a suitable machine for carrying out the present process;

Fig. 2 is a section along the line 2—2 of Fig. 1, but on a considerably enlarged scale;

Fig. 3 is a plan view of a piece of an asbestos-cement sheet having contrastingly colored areas;

Fig. 4 is an elevational view on an enlarged scale of one of the filter cylinders employed for picking up the asbestos-cement composition, and Fig. 5 is a plan view of a piece of an asbestos-cement sheet resulting from the use of the cylinder shown in Fig. 4.

The process of the present invention is carried out in such a manner as to apply a plurality of layers of substantially naturally colored asbestos-cement composition to a travelling belt, and then when sufficient of these have accumulated, to apply first a base veneer of a contrasting color and then a top veneer of still a different color which latter is applied, however, so as not completely to overlie the base veneer. Self-evidently therefore the base veneer will be visible at those portions where it is not covered by the top veneer. The result will be the production of an ornamented asbestos-cement sheet with the ornamentation being a part thereof.

Thus for example there may be provided an asbestos-cement making machine such as broadly illustrated in Fig. 1, and which comprises a plurality of tanks or vessels 6, 7, 8 and 9, which contain, respectively, naturally colored asbestos-cement composition, naturally colored asbestos-cement composition, cement composition colored to provide a base veneer, and an asbestos-cement composition colored to provide a top veneer.

Rotating in the said tanks 6, 7, 8 and 9 are, respectively, filter cylinders 16, 17, 18 and 19, which are supported on horizontal trunnions 10, 11, 12 and 13. An endless fabric belt 14 runs over suitable supporting pulleys 15, 20, 21, 22, 23, 24 and 25 in the direction of the arrows, the said belt 14 being in contact with the periphery of the filter cylinders 16, 17, 18 and 19, so that any of the asbestos-cement composition, which is picked up by the cylinders in accordance with the well known Hatschek method, will be transferred to the said fabric belt 14. In order to withdraw water which may be in this belt, there are provided a plurality of suction boxes 26, 27, 28, 29, 30, 31 and 32. The boxes 30 and 31 serve to draw the residual of extractable water from the multiple layers of the composition adhering to belt 14; the very last numbered box 32 serving to withdraw any water or moisture remaining on the belt before it makes its contact with the first filter cylinder 16 contained in container 6. Pulley 24 is mounted so as to be adjustable, so that the tension on the belt can be controlled.

The filter cylinder 18 in the base veneer mixture tank 8 will of course continually pick up a base veneer material of whatever color it happens to be, and would of course transfer this to the two uncolored layers already existing on the belt 14, which it had picked up from the filter cylinders 16 and 17. Inasmuch, however, as it is desired to accumulate a number of uncolored layers or natural colored layers, there is provided a wash-off pipe 33 which is located above the surface of the material in the tank 8, and which pipe is provided with suitable perforations 34 through which a spray of water may be directed against the periphery of the filter cylinder 18, thereby washing off any of the material which the cylinder might have picked up.

The last tank, 19, is provided with a perforated wash-down pipe 35 having a number of perforations 36 which eventuate sprays 37 which can be directed against the surface of the filter cylinder 19.

The said pipe 35 is mounted in sliding supporting members 38 and 39 and is arranged to be reciprocably moved therein by means of the mechanism 40 (shown in Fig. 2) which comprises, for instance, a lever 41 pivoted on the pivot 42 and having a connecting link 43 pivoted thereon at 44, the upper half of the lever 41 being provided with a slot 45 which engages a suitable pin 46 affixed to the pipe 35. One end of this pipe is closed, as for example by means of a cap 47, while the other end is connected by means of a flexible hose 48 with a water pipe 49, there also being provided a suitable shut off valve 50. If it is desired to have, for example, as in the prior art, only a single veneer layer then the pipe 35 can be held stationary and all the sprays kept in use, so that all of the material will be washed back. However, when it is desired to allow some of the material from tank 9 to get on to the sheet, then the spray will be interrupted at least so far as a number of the perforations 36 is concerned. For instance, the third one from each end may be allowed to remain open, while the others are closed by means of shut-off devices such as valves, plugs, sleeves and the like. Increase and decrease of spray-water pressure will also add to the variation. The result will be of course a washing back of the top veneer mixture at the points where the particular sprays which are in operation impinge against the periphery of the filter cylinder 19. The result will be the formation of a sheet which has a continuous base veneer layer but a discontinuous top veneer layer, the top veneer being applied only to those areas where there is no spray.

Let it be assumed for instance that a six layer thick material is to be made. The operation will then be as follows:

For a sufficient length, to correspond to the desired size of the accumulator roll, say for instance, 13 feet, the belt 14 is allowed to contact cylinders 16, 17 from which it will pick up material from tanks 6 and 7, while full sprays will be directed against cylinders 18 and 19 so that only base material will be traveling on the belt until it is picked up as shown at the extreme left of Fig. 1, by the accumulator roll 51 on which a plurality of layers is accumulated. This operation may be fully automatic and synchronized with the accumulator roll so that the veneer will be applied at the proper time to form a 13 foot surface on the belt and will be picked up by the accumulator roll on the first or face layer. The accumulated sheet is then cut from the roll 51 in a well known manner which does not interrupt the rotation thereof, and is then received upon take-off conveyor belt 66. After, say, about six such layers have accumulated, the spray 34 out of pipe 33 is shut off as a result of which there will now be impressed upon the material on belt 14 a layer of the base veneer, which, for instance, and purely for purposes of example, may be colored an ultramarine blue.

The continuous spray which had been directed against cylinder 19 in tank 9 would be shut off and a spray allowed only to play, say, from the third and sixth holes from the left of pipe 35, with the result that there will be a washback only through the third and sixth sprays. There will thus result a sheet such as shown in Fig. 3, which will have, for example, a white top veneer 59 and an irregular strip of therethrough visible base veneer 58. The irregularity is occasioned by the reciprocation of the pipe 35 under the influence of the reciprocating mechanism of which the lever 41, the slot 45, and the pin 46, attached to the pipe 35, are a part. It will be evident that by obturating any particular one of the holes 36 in the pipe 35, any desired orientation of wash-back can be obtained, and therefore the design of the shingle changed at will. By varying the pressure of the wash-back sprays, further variation can be effected.

It is also desired to have present in the tank 9 a second wash-back pipe 52 provided with perforations 53 which may serve as a permanent spray-back pipe to be used when all of the top veneer layer is to be washed off, and which may be shut off whenever a top veneer is to be picked up, at which time, however, the pipe 35 with its particular openings 36, will be brought into play. Methods for shutting off the spray coming from pipe 52 and the putting into play of the spray from pipe 35 will be under the control of the operator by suitable quick-opening valves which are so well known that they need not be particularly herein described, or may be entirely automatic and synchronized with the accumulator roll and set for the desired number of layers per sheet. For the sake of simplicity, the permanent spray-back pipe has been omitted from Fig. 2.

The further disposition of the sheets produced is of course outside of the process of the present invention, and follows well known procedure fully familiar to those who are engaged in the manufacture of asbestos-cement sheets.

An alternative method for producing a decorative two-tone asbestos-cement shingle is illustrated in Figs. 4 and 5, Fig. 5 showing a part of a sheet which is provided with a surface coating 59 through which areas of the base veneer coating 58 are visible. This is accomplished by providing the cylinder 19, as shown in Fig. 4, with certain areas 60, 61, 62, 63, 64 and 65, in which the wire mesh of which the cylinder is formed have been obturated or plugged by means of some water-impermeable material such as a wax, varnish, asphalt or the like, so that at these points the cylinder will not act as a filtering medium. Therefore, the cylinder will pick up veneer mixture only at the points where it is not plugged up by the areas 60 to 65. The cylinder is kept from picking up anything at all by operating the spray 53 from the pipe 52, except when the veneer layer is to be picked up, in which case the spray is shut off. For that type of operation of course the pipe 35 and perforations 36 may either be omitted, or simply kept inactive. The result will be the application of a partial top veneer layer to the base veneer layer, which will be visible through those areas which are free of the top veneer.

In the illustration in Figs. 4 and 5 very arbitrary shapes have been shown purely for purpose of illustration. Self evidently the designs may be highly ornamental such as in the form of stars, crescents, or flowers, or any other desired shape.

The operator thus has it within his power to produce a shingle or siding material which has two coats, one of a base veneer and the other of a top veneer, the top veneer being sufficiently discontinuous so as to allow some of the base veneer layer to be visible.

It will be self-evident that the invention can still be practiced even though no base veneer layer at all is used in which case the base will simply be the natural gray color of the asbestos-cement mixture, and the invention is to be construed as covering that particular though perhaps less desirable modification of the present invention.

The washing back of the veneer layers all over the cylinder is, of course, a well known expedient and has been practiced in this art for many years, and therefore substantially all machines for the manufacture of asbestos-cement shingles by the wet or Hatschek method are already provided with wash-back pipes. All that is required, therefore, is to provide means for shutting off certain of the perforations in these pipes so that the wash-back, when desired, can be accomplished at selected areas, and also if desired to provide means to impart oscillatory movement to the pipe so that the wash-back areas will have an undulating outline. Therefore the present method can be adapted, without great expense, to presently available equipment which makes the method of the present invention very attractive, because it can be so readily placed into operation without the purchase of much additional equipment.

Moreover, if the second modification is to be used, all that is necessary is to take the cylinder which applies the top veneer layer and to block out certain areas of the wire mesh cloth thereof with an obturating medium so that at that point it will not pick up the top veneer layer material.

Shingles and siding made in accordance with the present invention have an ornamental appearance which can be further enchanced by impressing thereinto any suitable indentations or markings so as to have it resemble, for instance, wood grain, or a weathered wood appearance, etc.

The exact means for producing reciprocatory movement of the pipe need not be shown and any mechanical equivalent is to be considered as within the scope and purport of the present invention.

Applicant claims:

Process of producing color-ornamented asbestos-cement sheets which comprises building up a laminated structure of unset asbestos-cement composition, applying a continuous base veneer layer of a colored asbestos-cement composition thereto, picking up a continuous layer of an unset differently colored asbestos-cement top veneer composition on a filter-cylinder, washing off preselected areas of said differently colored composition from said filter cylinder, and transferring the said residual differently colored composition onto said base veneer layer.

EDGARD M. BOLLAERT.

REFERENCES CITED

The following references are of record in the file of this patent:

UNITED STATES PATENTS

| Number | Name | Date |
|---|---|---|
| 202,483 | Syms | Apr. 16, 1878 |
| 987,678 | Howes | Mar. 21, 1911 |
| 1,471,169 | Kaye | Oct. 16, 1923 |
| 1,623,278 | Sears et al. | Apr. 5, 1927 |
| 1,643,373 | Clapp | Sept. 17, 1927 |
| 1,810,316 | Lamory | June 16, 1931 |
| 1,847,269 | Schur | Mar. 1, 1932 |
| 1,921,649 | Becker | Aug. 8, 1933 |
| 1,972,127 | Beeson | Sept. 4, 1934 |
| 2,182,353 | Rembert | Dec. 5, 1939 |
| 2,236,582 | Schuetz | Apr. 1, 1941 |
| 2,307,733 | De Vault | Jan. 12, 1943 |
| 2,335,722 | Adams | Nov. 30, 1943 |
| 2,348,804 | Gerity | May 16, 1944 |

FOREIGN PATENTS

| Number | Country | Date |
|---|---|---|
| 136,714 | Austria | Mar. 10, 1934 |